United States Patent
Rogers et al.

(10) Patent No.: US 7,841,668 B2
(45) Date of Patent: Nov. 30, 2010

(54) SIDE DUMP BODY HAVING AN INCREASED CARRYING CAPACITY

(76) Inventors: Ralph R. Rogers, 841 N. Shay Rd., Dakota Dunes, SD (US) 57049; Kelly Rogers, 68 Sunset Dr., Dakota Dunes, SD (US) 57049; Bobby Rogers, 610 Lakeview Dr., North Sioux City, SD (US) 57049

( * ) Notice: Subject to any disclaimer, the term of this patent is extended or adjusted under 35 U.S.C. 154(b) by 491 days.

(21) Appl. No.: 12/072,646

(22) Filed: Feb. 27, 2008

(65) Prior Publication Data

US 2009/0195052 A1 Aug. 6, 2009

Related U.S. Application Data

(63) Continuation-in-part of application No. 12/012,100, filed on Jan. 31, 2008.

(51) Int. Cl.
*B60P 1/16* (2006.01)
(52) U.S. Cl. .................................................. 298/17.7
(58) Field of Classification Search ................ 298/13, 298/17.5, 17.6, 17.7, 18, 22 R, 22 P, 22 F, 298/21 R, 19 V, 23 DF, 23 MD, 23 D, 25; 414/470
See application file for complete search history.

(56) References Cited

U.S. PATENT DOCUMENTS

| 10,441 | A | * | 1/1854 | Bailey | ........................ 298/17.7 |
|---|---|---|---|---|---|
| 5,480,214 | A |   | 1/1996 | Rogers | |
| 5,967,615 | A |   | 10/1999 | Rogers | |
| 6,056,368 | A |   | 5/2000 | Rogers | |
| 6,179,385 | B1 |   | 1/2001 | Rogers | |
| 6,199,955 | B1 |   | 3/2001 | Rogers | |

* cited by examiner

*Primary Examiner*—Stephen Gordon
(74) *Attorney, Agent, or Firm*—Dennis L. Thomte; Thomte Patent Law Office LLC

(57) ABSTRACT

A wall extension apparatus is movably positioned on the upper end of a side dump body to increase the carrying capacity thereof. The extension apparatus may be pivotally moved from a transport position to either a first side dumping position to a second side dumping position. When in its transport position, the extension apparatus extends upwardly from the upper ends of the side dump body. Various embodiments of the invention are disclosed.

3 Claims, 15 Drawing Sheets

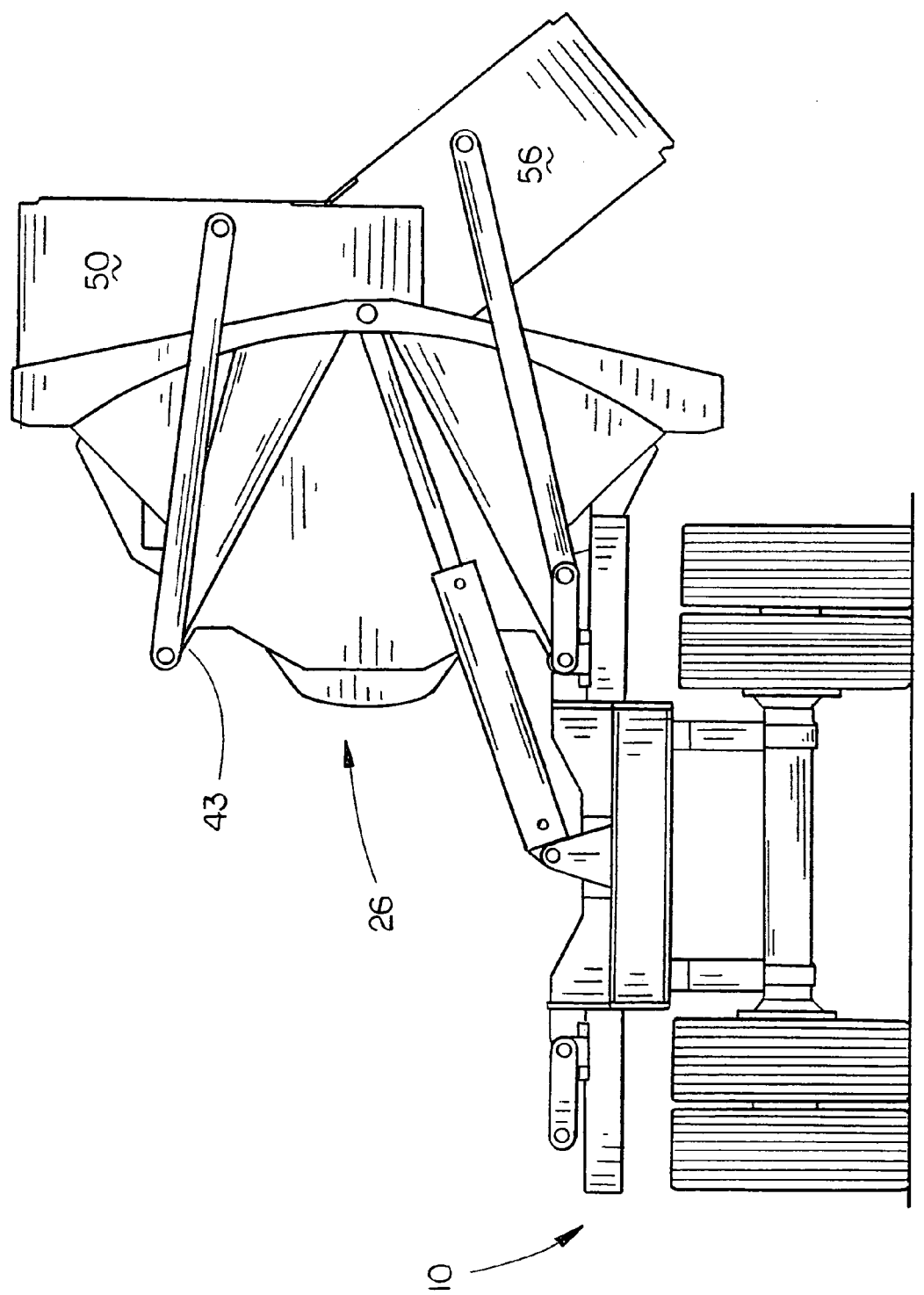

SIDE DUMP BODY HAVING AN INCREASED CARRYING CAPACITY

CROSS REFERENCE TO RELATED APPLICATION

This is a continuation-in-part application of the application entitled A SIDE DUMP BODY HAVING AN INCREASED CARRYING CAPACITY, Ser. No. 12/012,100 filed Jan. 31, 2008.

BACKGROUND OF THE INVENTION

1. Field of the Invention

This invention relates to a side dump body for a truck or trailer and more particularly to a side dump body which has an increased carrying capacity when compared to existing side dump trailers. More particularly, the carrying capacity of the side dump body is increased through the use of a wall extension apparatus which is movably positioned on the upper end of the side dump body.

2. Description of the Related Art

Side dump bodies for use on trucks and trailers have become extremely popular in recent years since the introduction of the side dump trailer of co-applicant which is disclosed in U.S. Pat. No. 5,480,214. In co-applicant's original side dump trailer, the side dump body included a bottom wall having side walls extending upwardly and outwardly from the side edges thereof with the rearward and forward ends of the body being closed by a rear wall and a front wall, respectively. The side dump body of co-applicant's previous invention could be pivotally moved to either side of the truck or trailer to dump the contents of the side dump body. Although the side dump body of co-applicant's previous invention has met with great success, the side dump body thereof is somewhat limited in its carrying capacity due to the required shape of the dump body which enables the dump body to be moved to its dumping positions. The dump body of co-applicant's previous invention may be increased in height to increase the carrying capacity, but if the angle side walls thereof are upwardly extended to increase the carrying capacity thereof, the side dump body would exceed highway width restrictions.

In an effort to solve the problems of the prior art, co-applicant invented and patented the side dump bodies disclosed in U.S. Pat. Nos. 5,967,615; 6,056,368; 6,179,385 and 6,199,955. Although the side dump bodies disclosed in the above-identified patents have met with success, applicants have devised a new method of increasing the carrying capacity of a side dump trailer through the use of a wall extension apparatus such as disclosed hereinafter.

In applicants' co-pending application, several embodiments of the invention were disclosed and described. This application discloses, describes and claims a further embodiment of the invention.

SUMMARY OF THE INVENTION

A side dump body having an increased carrying capacity is disclosed wherein the side dump body is pivotally mounted on a wheeled frame of a truck or trailer. The side dump body is pivotally movable with respect to the wheeled frame so as to be able to dump the contents thereof at either the first side of the wheeled frame or the second side of the wheeled frame. The side dump body includes a bottom wall, first and second side walls extending upwardly from the bottom wall, a forward end wall and a rearward end wall. Each of the first and second side walls of the side dump body have forward and rearward ends with each of the forward and rearward end walls of the side dump body having first and second ends with the side walls and the end walls of the side dump body having upper ends.

A wall extension apparatus is movably positioned on the upper ends of the walls of the side dump body as illustrated in the drawings wherein five different embodiments of the wall extension apparatus are shown. In one embodiment, the wall extension apparatus includes an upstanding first side wall member having upper and lower ends and forward and rearward ends, an upstanding second side wall member having upper and lower ends and forward and rearward ends, an upstanding forward wall member having upper and lower ends and first and second ends, and an upstanding rearward wall member having upper and lower ends and first and second ends. The first side wall member, the second side wall member, the forward wall member and the rearward wall member of the wall extension apparatus are normally positioned on the upper ends of the first side wall, the second side wall, the forward end wall and the rearward end wall of the side dump body respectively. The wall extension apparatus of this embodiment is selectively pivotally movable with respect to the side dump body between a transport position to either a first side dumping position or to a second side dumping position. The lower ends of the first side wall member, the second side wall member, the forward wall member and the rearward wall member of the wall extension apparatus are in sealing engagement with the upper ends of the first side wall, the second side wall, the forward end wall and the rearward end wall of the side dump body respectively when the wall extension apparatus is in its transport position. The lower end of the first side wall member of the wall extension apparatus is spaced from the upper end of the first side wall of the dump body when the wall extension apparatus is in its first side dumping position. The lower end of the second side member of the wall extension apparatus is spaced from the upper end of the second side wall of the side dump body when the wall extension apparatus is in its second side dumping position. A forward hydraulic cylinder is secured to the forward end wall of the side dump body and to the forward wall member of the wall extension apparatus and a rearward hydraulic cylinder is secured to the rearward end wall of the side dump body and to the rearward wall member of the wall extension device for pivotally moving the wall extension apparatus between its transport position, its first side dumping position and its second side dumping position.

In another embodiment, the forward wall member of the wall extension apparatus just described is replaced by a pair of forward wall members which are pivotally secured together. In this embodiment, the upstanding rearward wall member of the previous embodiment is replaced by a pair of rearward wall members which are pivotally secured together. In this embodiment, a first forward hydraulic cylinder is pivotally secured to and extends between the forward wall members of the wall extension apparatus and a second rearward hydraulic cylinder is pivotally connected to and extends between the first and second rearward wall members of the wall extension apparatus for pivotally moving the wall extension apparatus from its transport position to either of its first or second side dumping positions.

In another embodiment of the invention, the wall extension apparatus is essentially identical to the embodiment discussed immediately above except that four hydraulic cylinders are used to pivotally move the wall extension apparatus between its transport position, its first side dumping position and its second side dumping position.

In yet another embodiment, the structure of the wall extension apparatus is substantially the same as the first and second embodiments discussed above except that the wall extension apparatus of this embodiment is moved between its transport position, its first side dumping position and its second side dumping position by a pulley and cable arrangement at the forward and rearward ends thereof.

In still another embodiment, the wall extension apparatus only includes a single side wall member which is pivotally secured to the forward and rearward ends of the side dump body by forward and rearward end wall members secured to the opposite ends of the side wall member with the inner ends of the forward and rearward end wall members being pivoted to the upper central positions of the forward and rearward end walls of the side dump body respectively. In this embodiment, the wall extension apparatus is manually moved between its transport position to either a first side dumping position or to a second side dumping position.

In yet another embodiment, which is the subject of this continuation-in-part application, the wall members of the wall extension apparatus are identical to that illustrated in FIGS. 1-9 with the wall members being moved between their transport and side dumping positions in a different manner. In the embodiment of FIG. 13, the wheeled frame has first, second, third and fourth hinge members secured thereto which receive first, second, third and fourth hinge members or pivot pins secured to the frameworks of the forward and rearward end walls of the side dump body.

First, second, third and fourth supports, having inner and outer ends, have their inner ends secured to the first, second, third and fourth hinge members of the wheeled frame and extend laterally outwardly therefrom. First, second, third and fourth link members, having upper and lower ends, are secured at their lower ends to either the outer ends of the first, second, third and fourth supports respectively or to the first, second, third and fourth hinge members or pivot pins of the side dump body respectively. The upper ends of the first, second, third and fourth links are secured to the forward and rearward wall members of the wall extension apparatus.

When it is desired to dump the contents of the side dump body to the left or first side of the wheeled frame, the lower ends of the second and third link members are secured to the outer ends of the second and third supports and the lower ends of the first and fourth link members are secured to the first and fourth hinge members of the side dump body. The movement of the side dump body to its first side dumping position causes the left side of the wall extension apparatus to be moved from its transport position to its first side dumping position.

When it is desired to dump the contents of the side dump body to the right or second side of the wheeled frame, the lower ends of the first and fourth link members are secured to the outer ends of the first and fourth supports and the lower ends of the second and third link members are secured to the second and third hinge members of the side dump body. The movement of the side dump body to its second side dumping position causes the right side of the wall extension apparatus to be moved from its transport position to its second side dumping position.

It is therefore a principle object of the invention to provide an improved side dump body for a truck or trailer which has an increased carrying capacity compared to prior art side dump bodies.

A further object of the invention is to provide a wall extension apparatus for a side dump body which increases the carrying capacity thereof and which is movable between a transport position, a first side dumping position and a second side dumping position.

A further object of the invention is to provide a wall extension apparatus for a side dump trailer which is easily attached to existing side dump bodies without extensive modification thereof.

These and other objects will be apparent to those skilled in the art.

BRIEF DESCRIPTION OF THE DRAWINGS

FIG. 15 is a rear view of the embodiment of FIGS. 13-14 in its second side dumping position;

DESCRIPTION OF THE PREFERRED EMBODIMENT

Figure 1:
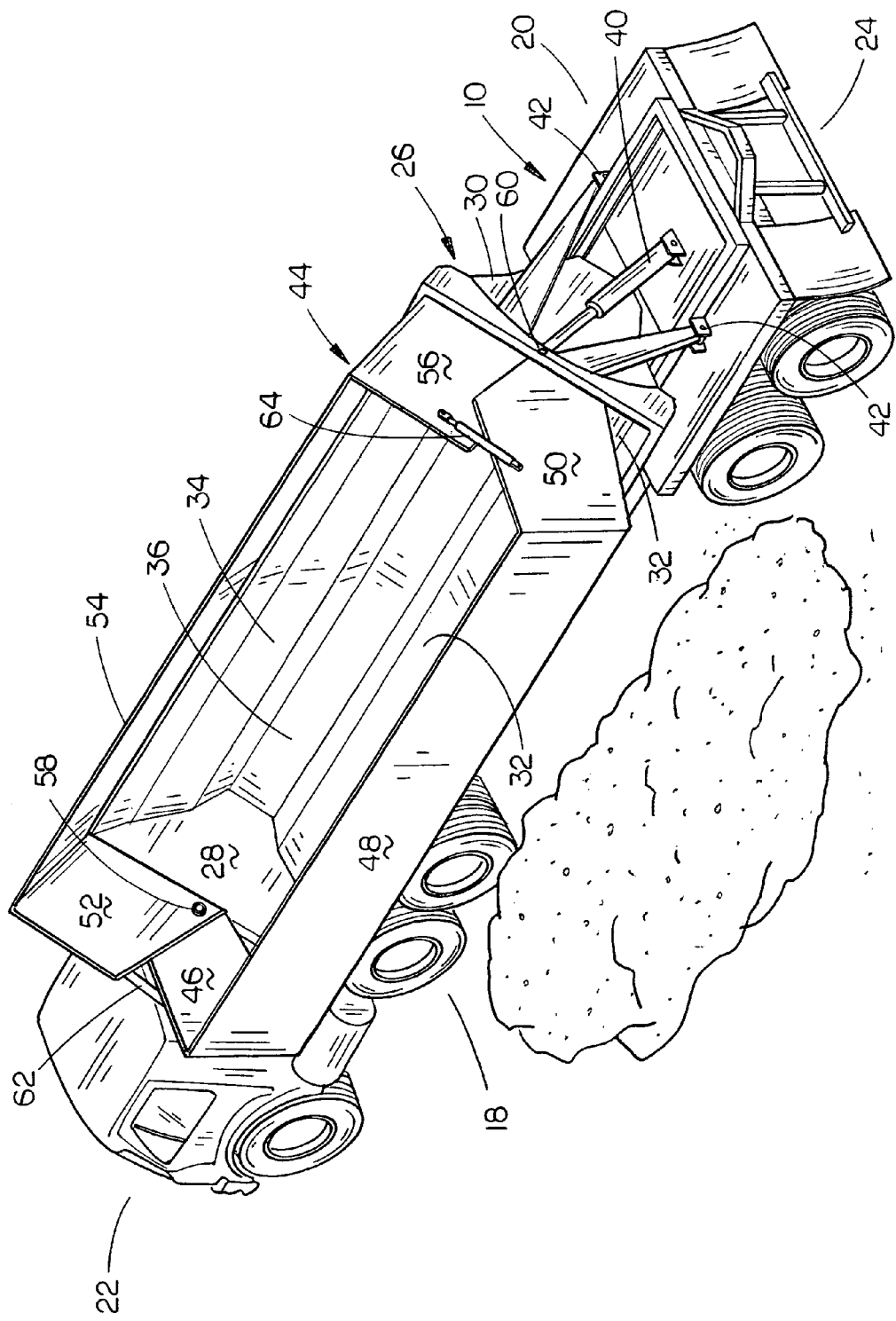
FIG. 1 is a rear perspective view of a conventional side dump trailer illustrated in its first side dumping position and which has the first embodiment of the invention positioned thereon.
Figure 2:
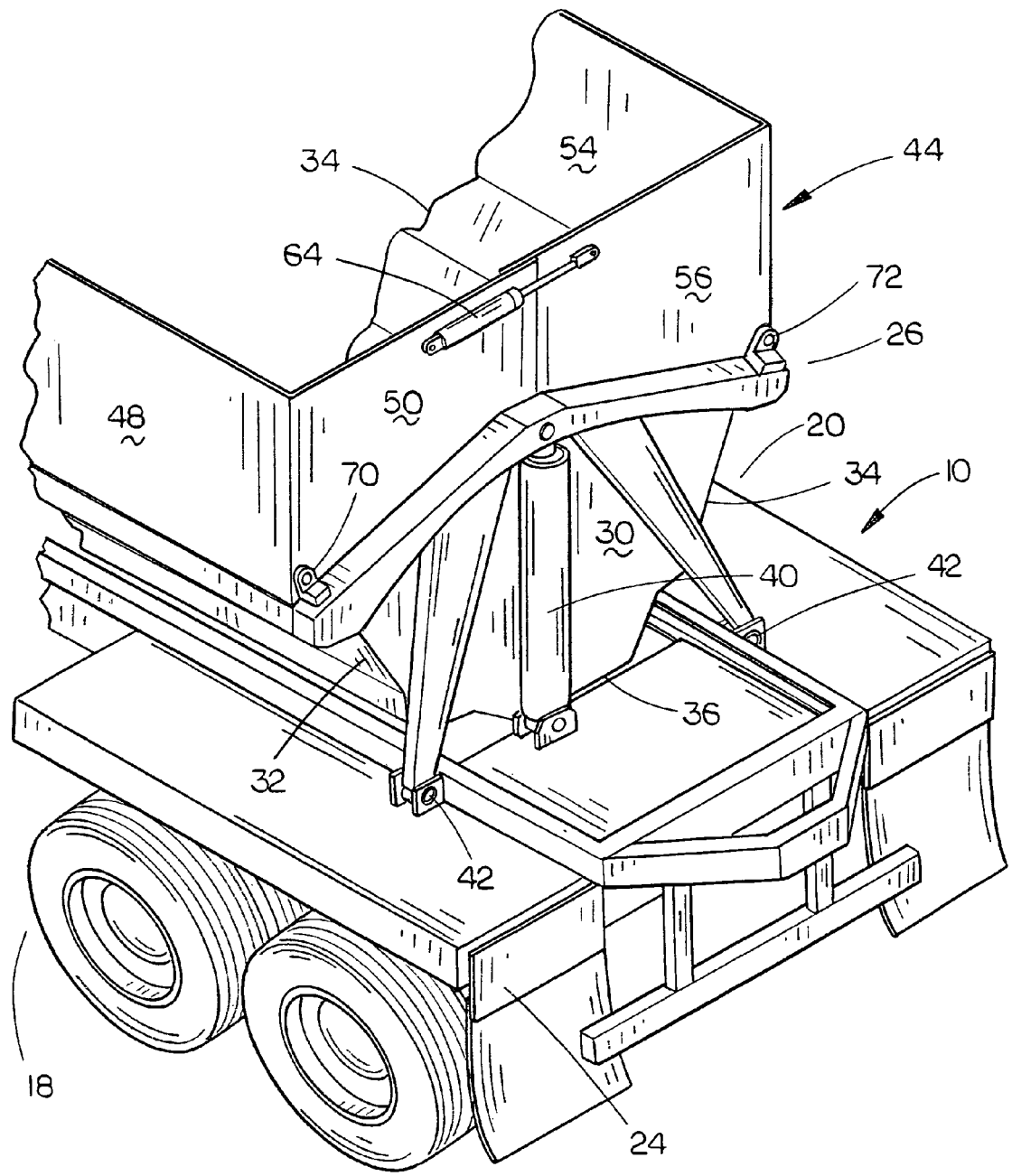
FIG. 2 is a partial rear perspective view of the embodiment of FIG. 1.

The numeral 10 refers generally to a wheeled frame which may be part of a truck or trailer. Wheeled frame 10 includes a pair of longitudinal extending frame members 12 and 14 having a plurality of cross members 16 positioned thereon and extending therebetween. For purposes of description, the wheeled frame 10 will be described as having a first side 18, a second side 20, a forward end 22 and a rearward end 24.

A conventional side dump body is referred to generally by the reference numeral 26. For purposes of description, side dump body 26 will be described as having a forward end wall 28, a rearward end wall 30, a first side wall 32 a second side wall 34 and a bottom wall 36. A forward hydraulic cylinder 40 (not shown) is pivotally secured to the framework of the forward end wall 28 and the wheeled frame 10 and extends therebetween. A rearward hydraulic cylinder 40 is pivotally secured to and extends between the framework of the rearward end wall 30 and the wheeled frame 10 as seen in FIG. 1 in an identical fashion to the forward hydraulic cylinder. The hydraulic cylinders are provided to pivot the side dump body 26 between its transport position, a first side dumping position and a second side dumping position in conventional fashion. The side dump body 26 also includes releasable locking or hinge pins generally referred to by the reference numerals 42 so that the side dump body 26 may be pivoted to its side dumping positions in conventional fashion such as described in co-applicants' earlier U.S. Pat. No. 5,480,214. Although a particular shape of a side dump body 26 is illustrated in the drawings, the side dump body 26 may take many different shapes but in all cases, the end walls 28 and 30 and the side walls 32 and 34 will have upper ends which define an open upper end of the side dump body to permit contents or materials to be dumped into and therefrom.

It is to the conventional side dump bodies that applicants' extension wall apparatus is utilized which is referred to generally by the reference numeral 44 in FIGS. 1-5 which illustrate applicants' first embodiment of the wall extension apparatus. Wall extension apparatus 44 includes a first forward wall member 46, a first side wall member 48, a first rearward wall member 50, a second forward wall member 52, a second side wall member 54, and a second rearward end wall member 56. The lower inner ends of forward wall members 46 and 52 are pivotally secured together by a pivot pin 58, which is also pivotally secured to the framework of the forward end wall 28. The lower inner ends of rearward wall members 50 and 56 are pivotally secured together by means of a pivot pin 60 which is also pivotally secured to the framework of the rearward end wall 30 of side dump body 26.

A hydraulic cylinder 62 is pivotally secured to and extends between forward wall members 46 and 52 and a hydraulic cylinder 64 is pivotally secured to and extends between the rearward wall members 50 and 56 as illustrated in FIG. 1. Selectively removable locking pins 66 and 68 selectively lock the lower outer ends of forward wall members 46 and 52 to the framework of the forward end wall 28 and selectively removable locking pins 70 and 72 selectively lock the lower outer ends of the rearward wall members 50 and 56 to the framework of rearward end wall 30. As seen in the drawings, the inner ends of the wall members 46 and 52 overlap one another as do the inner ends of the wall members 50 and 56.

Figure 3:
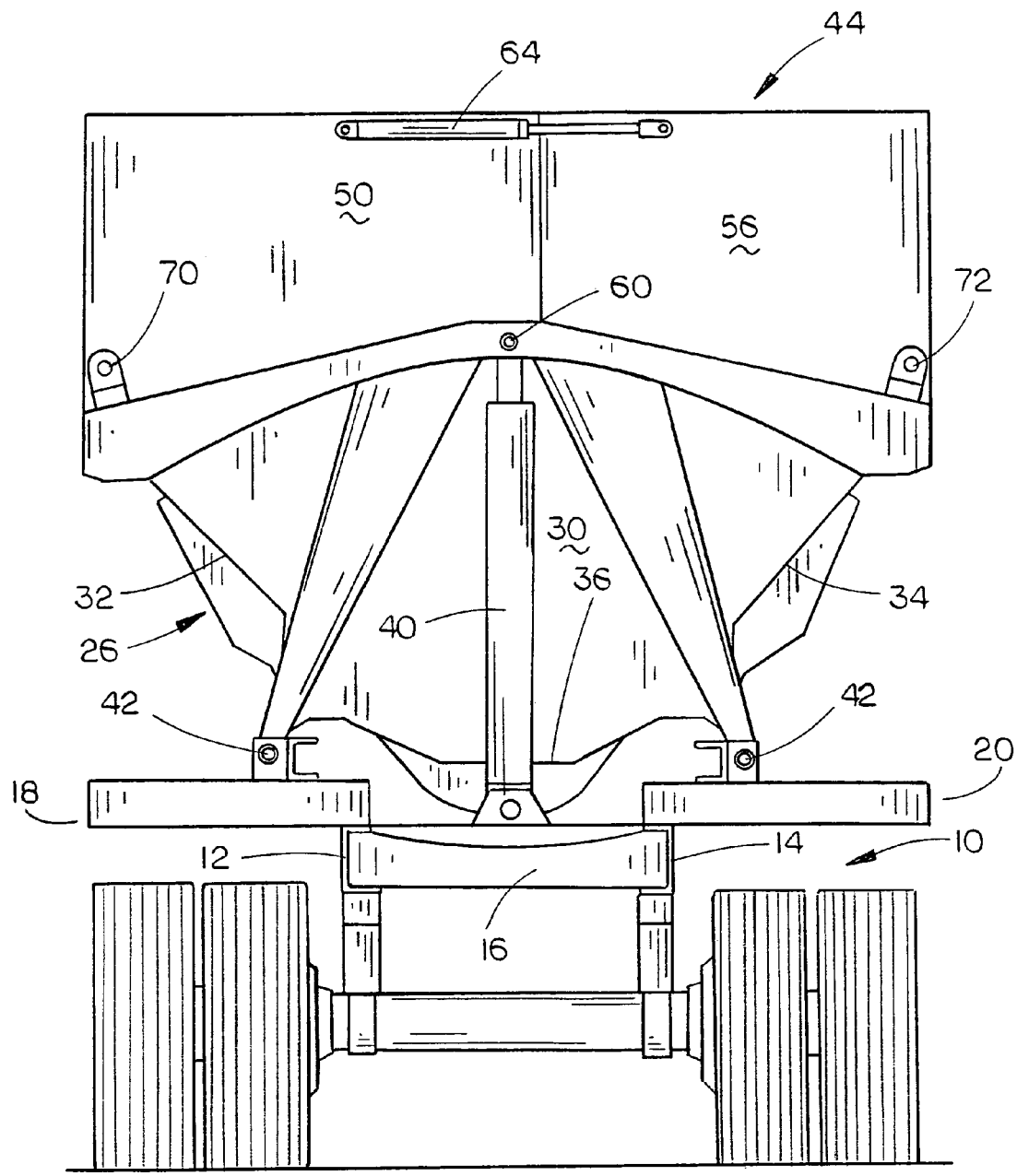
FIG. 3 is a rear view of the embodiment of FIG. 1 with the wall extension apparatus being illustrated in a transport position.
Figure 4:
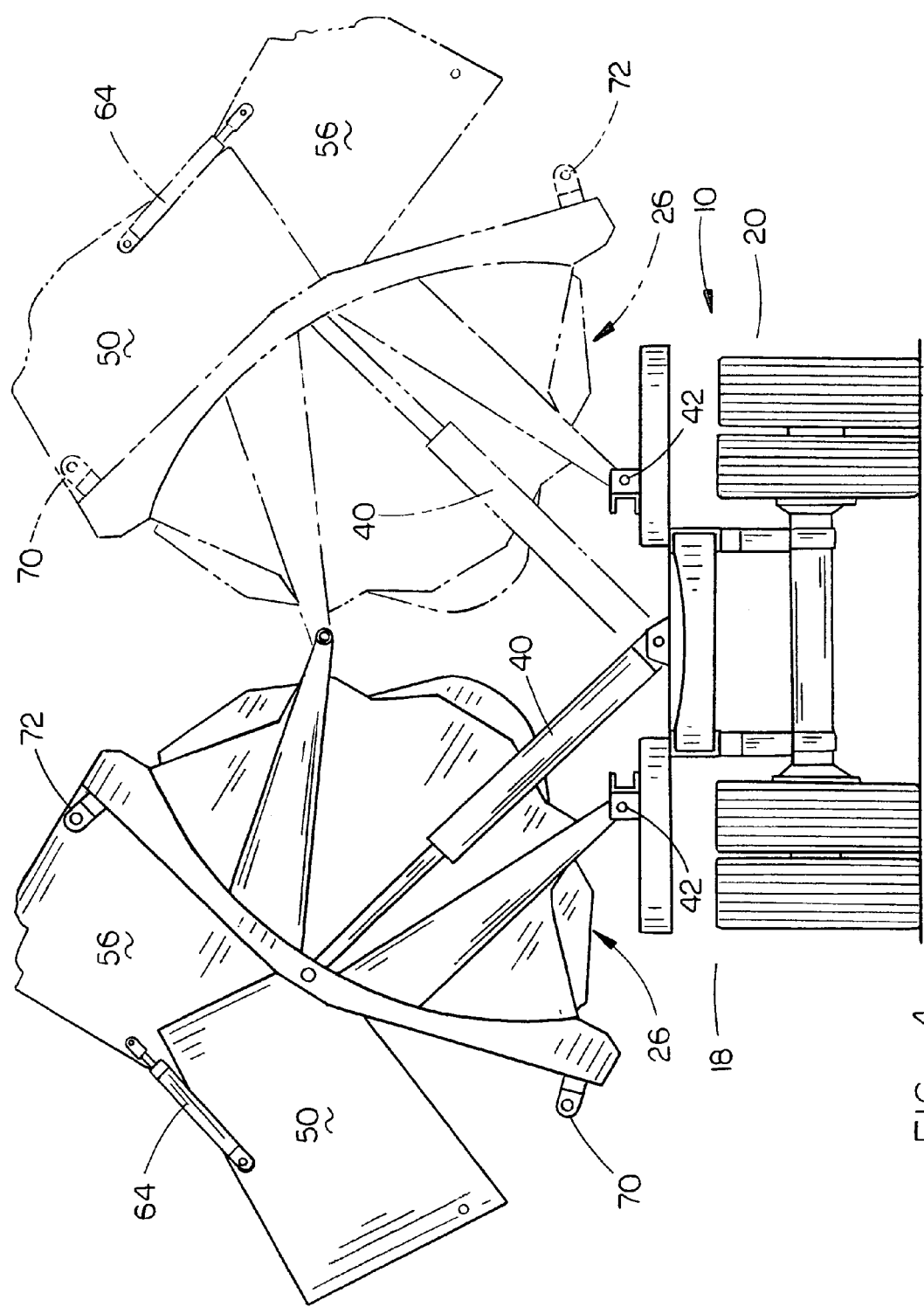
FIG. 4 is a rear view illustrating the embodiment of FIGS. 1-3 in a first side dumping position with the dotted lines illustrating the wall extension apparatus in its second side dumping position.
Figure 5:
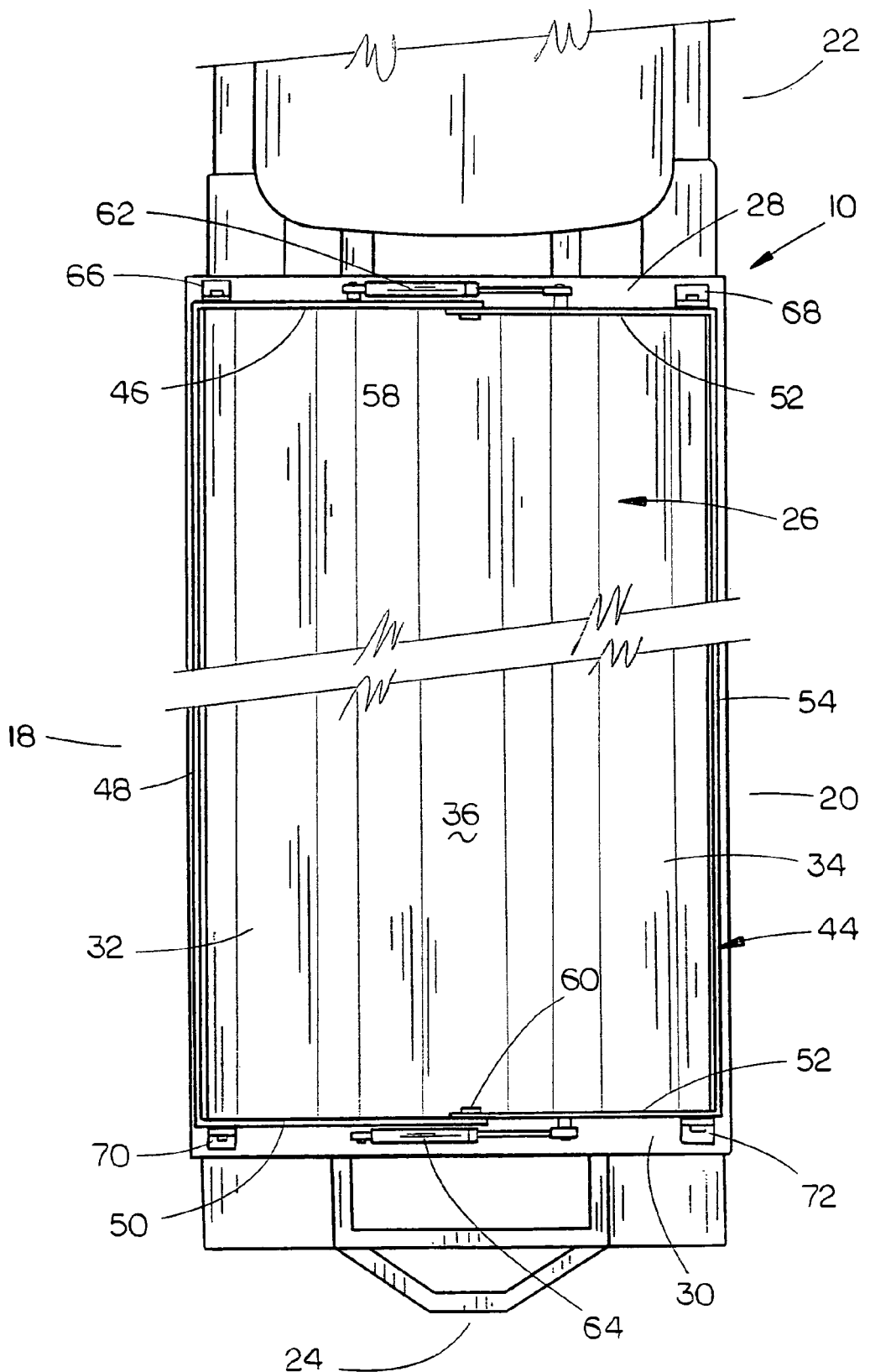
FIG. 5 is a partial top view of the embodiment of FIGS. 1-4.

When the wall extension apparatus 44 is in the transport position of FIG. 3, the locking pins 66, 68, 70 and 72 are in their locked positions to maintain the lower ends of the wall members 46, 52, 48, 54, 50 and 56 in sealing engagement with the upper ends of the end walls and side walls of the side dump body 26. With the wall extension apparatus 44 in the transport position of FIG. 3, the carrying capacity of the side dump body 26 is greatly increased. Although it is preferred that the wall extension apparatus 44 be constructed of steel or aluminum, other materials may be possibly used.

When the side dump body 26 and the wall extension apparatus 44 have been filled with material and the vehicle is driven to the dumping site, the material or contents within the side dump body 26 may be dumped from either side of the side dump body in conventional fashion. Assuming that the side dump body 26 is to be dumped to the left or first side of the truck or trailer, as seen in FIG. 1, the locking pins 42 on the right side of the side dump body 26 will be unlocked and the hydraulic cylinders will be extended to pivotally move the side dump body 26 from the position of FIG. 3 to the position of FIG. 1. Prior to actuating the hydraulic cylinders, the locking pins 66 and 70 will be unlocked. The hydraulic cylinders 38 and 40 will then be partially extended to tip the side dump body 26 towards its first side dumping position. The hydraulic cylinders 62 and 64 will then be retracted so the wall members 46, 48 and 50 pivotally move upwardly with respect to the side dump body 26 so that the material or contents of the side dump body 26 may pass from the side dump body 26 beneath the lower edge of the wall member 48.

When the material or contents have been dumped from the side dump body 26, the side dump body 26 will be returned to its transport position and the hydraulic cylinders 62 and 64 will be extended to cause the lower ends of the wall members 46, 48 and 50 to again engage the upper ends of the side dump body 26. The locking pins 66 and 70 will again be locked.

If the material is to be dumped from the second side of the side dump body 26, the locking pins 66 and 72 are disconnected rather than the locking pins 68 and 70 as previously described. That permits the lower ends of the wall members 52, 54 and 56 to pivotally move upwardly with respect to the upper ends of the side dump body 26 to enable the material to be dumped from the second side of the side dump body 26 beneath the lower end of the member 54.

Figure 6:
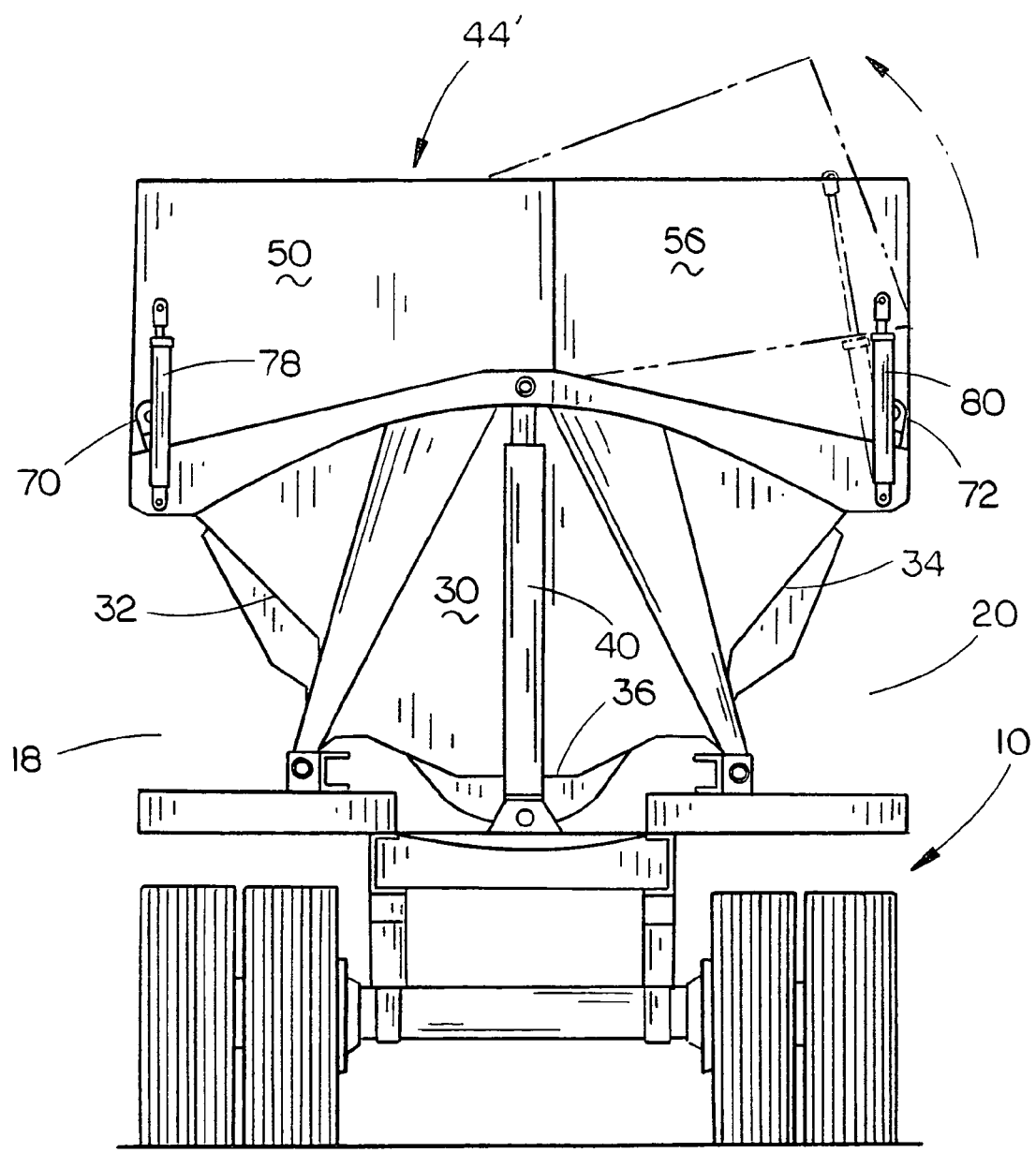
FIG. 6 is a rear view illustrating the second embodiment of the wall extension apparatus.
Figure 7:
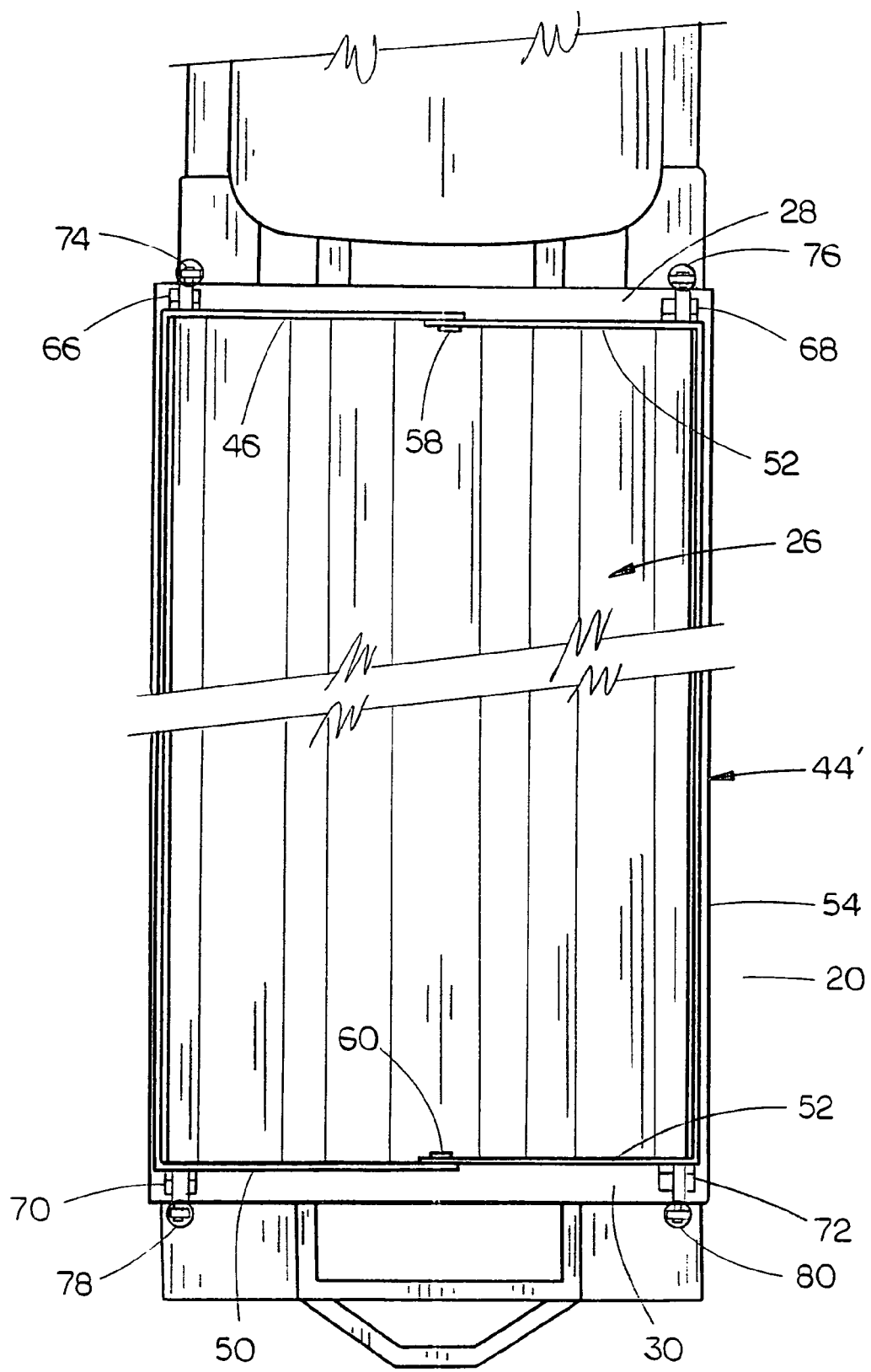
FIG. 7 is a partial top view of the second embodiment of FIG. 6.

The second embodiment of the wall extension apparatus is illustrated in FIGS. 6 and 7 and is referred to generally by the reference numeral 44'. The only difference between the embodiments of FIGS. 1-5 and that of FIGS. 6 and 7 is that a pair of hydraulic cylinders 74 and 76 are provided at the forward end of the wall extension apparatus and a pair of hydraulic cylinders 78 and 80 are provided at a rearward end of the wall extension apparatus. Hydraulic cylinder 74 is pivotally connected to and 1extends between the first forward wall member 46 and the framework of the forward end wall 28. Hydraulic cylinder 76 is pivotally secured and extends between the second forward wall member 52 and the framework of the forward end wall 28 of side dump body 26. Hydraulic cylinder 78 is pivotally secured to and extends between the first rearward wall member and the framework of the rearward wall 30 of side dump body 26. Hydraulic cylinder 80 is pivotally secured to and extends between the second rearward wall member 52 and the framework of rearward end wall 30 of side dump body 26. The embodiment of FIGS. 6 and 7 also includes the removable locking pins 66, 68, 70 and 72.

The extension wall apparatus 44' is pivotally movable to its first side dumping position by the extension of the hydraulic cylinders 74 and 78 when the locking pins 66 and 70 have been unlocked. The wall extension apparatus 44' is moved to its second side dumping position by the extension of the hydraulic cylinders 76 and 80 when the locking pins 66 and 72 have been unlocked.

Figure 8:
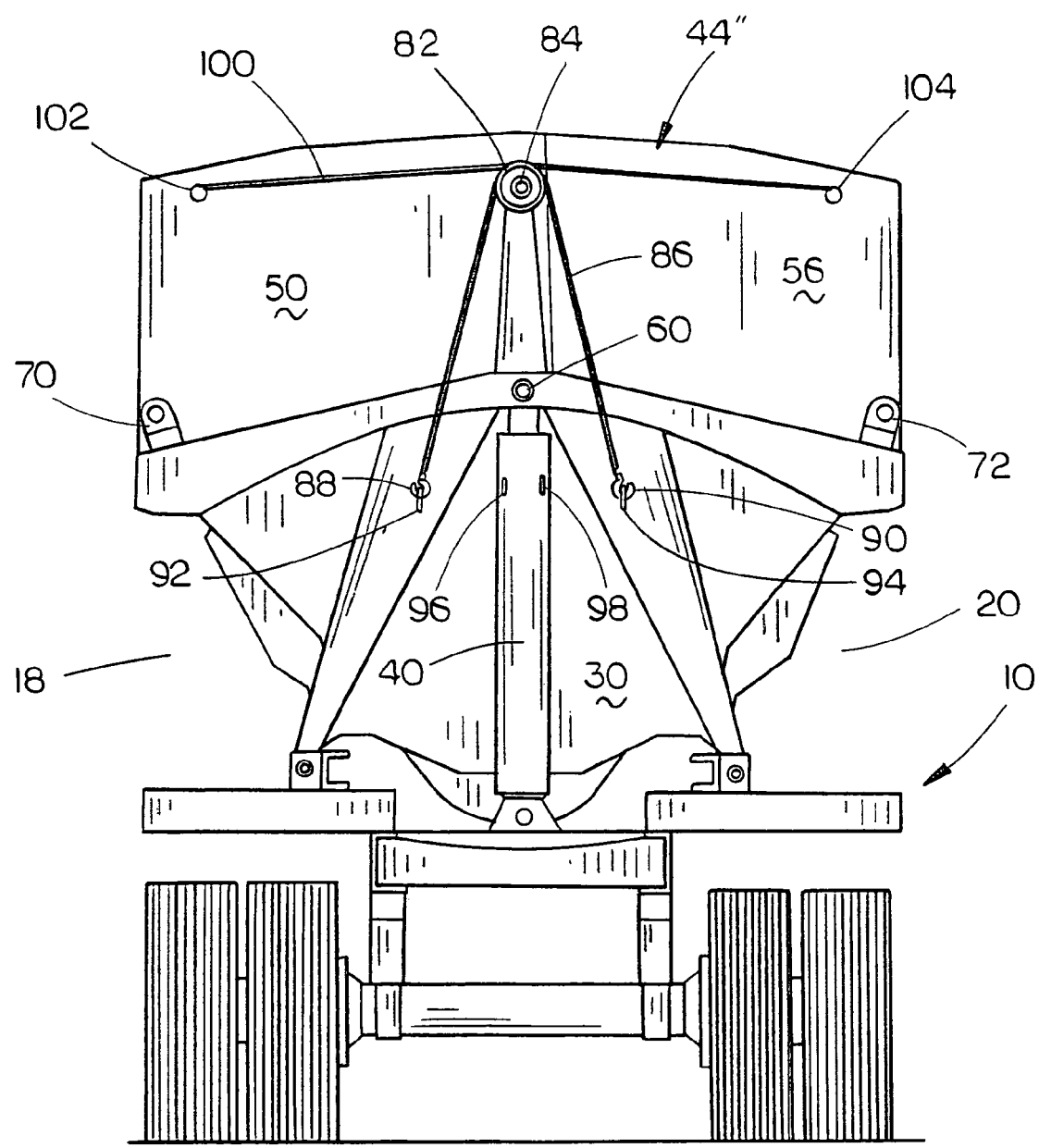
FIG. 8 is a rear view of the third embodiment of the wall extension apparatus.
Figure 9:
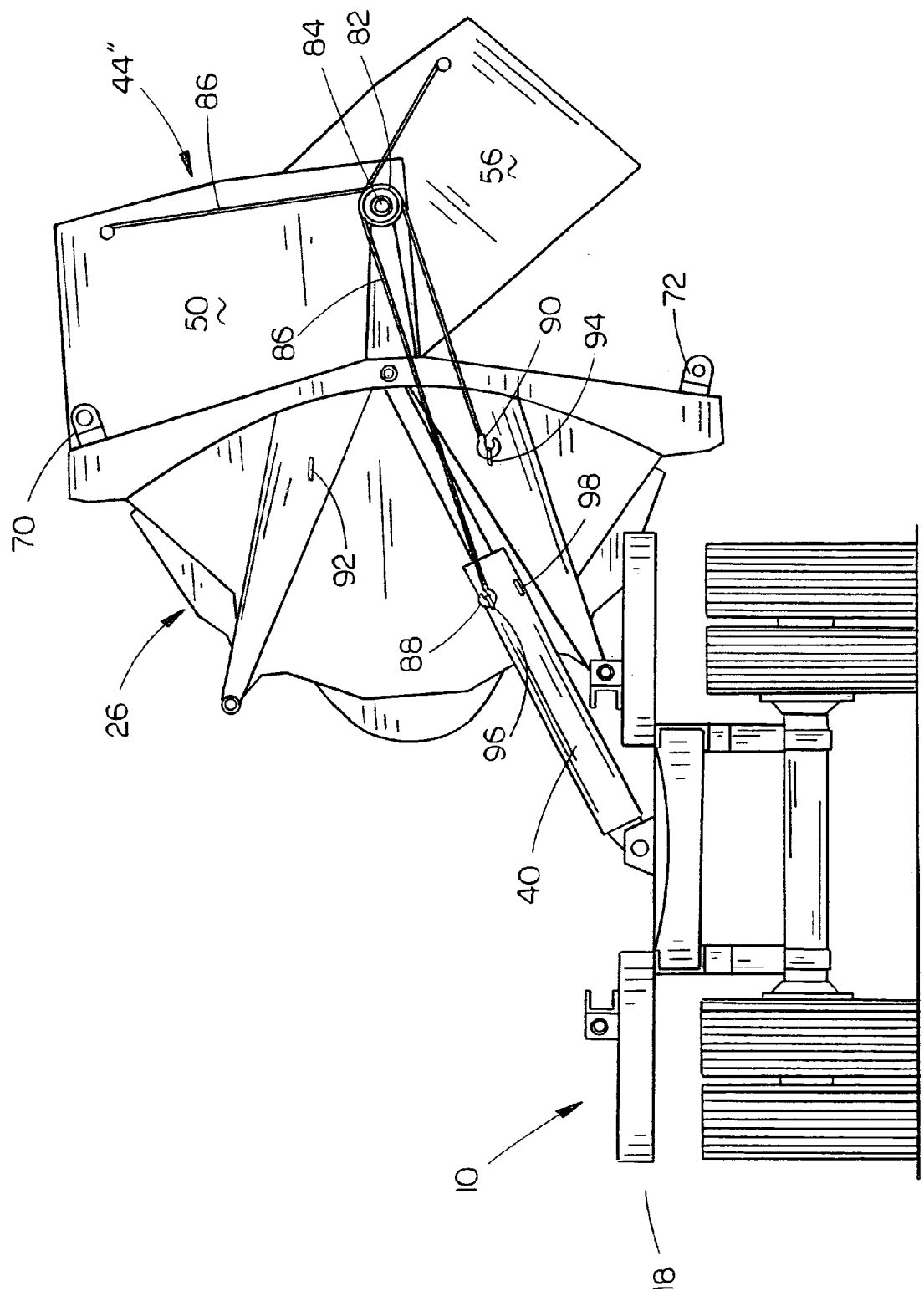
FIG. 9 is a rear view of the embodiment of FIG. 8 illustrating the wall extension apparatus in its second side dumping position.

The third embodiment of this invention is illustrated in FIGS. 8 and 9. The wall extension apparatus of the embodiment of FIGS. 8 and 9 is referred to generally by the reference numeral 44" and includes all of the structure of the wall extension apparatus 44 except that the hydraulic cylinders for moving the wall extension apparatus between its transport, first side dumping and second side dumping positions are not used but have been replaced by identical pulley and cable arrangements at the forward and rearward ends of the wall extension apparatus.

As seen in FIGS. 8 and 9, a double sheave pulley 82 is rotatably secured, about a horizontal axis referred to generally by the reference numeral 84, which is secured or mounted on the first rearward wall member 50 or other suitable mounting structure. A first elongated flexible cable 86 extends around one of the sheaves of the pulley 82 and has its ends 88 and 90 normally secured to eyelets 92 and 94 respectively which are secured to the framework of the rearward wall 30 of side dump body 26 on opposite sides of the hydraulic cylinder

40. As seen in FIG. 8, hydraulic cylinder 40 also has a pair of eyelets 96 and 98 provided on the body thereof. A second cable 100 has its opposite ends secured to the exterior surfaces of the rearward end wall members 50 and 56 at 102 and 104. The cable 100 is completely wrapped around the second sheave of the pulley 82. The first and second sheaves are secured together so that rotation of one of the sheaves causes rotation of the other sheave.

When the wall extension apparatus 44''' is in its transport position of FIG. 8, the ends 88 and 90 of cable 86 will be connected to the eyelets 92 and 94 which prevents rotation of the sheave 82. FIG. 9 illustrates the wall extension apparatus 44" in its second side dumping position. To permit the wall extension apparatus 44" to be moved to its second side dumping position, the end 88 of cable 86 is connected to eyelet 96 on hydraulic cylinder 40 and the end 90 remains connected to the eyelet 94. The locking pins 66 and 70 are unlocked and the extension of hydraulic cylinder 40 causes the cable 86 to rotate the sheave 82 which causes the cable 86 to be "shortened" adjacent one end thereof which causes the second end wall member 58, the second side wall member 54 and the second forward end wall member 52 to be moved upwardly with respect to the side dump body 26 so that material can be dumped therefrom beneath the members 52, 54 and 56.

When the hydraulic cylinder 40 is retracted, the side dump body 26 and the wall extension apparatus 44" return to their transport positions. If it is desired to dump the contents of the side dump body 26 from the first side thereof, end 88 of cable 86 will be connected to eyelet 92 and end 90 of cable 86 will be connected to eyelet 98 on hydraulic cylinder 40. The cable and pulley arrangement illustrated in FIGS. 8 and 9 is duplicated at the forward end of the wall extension apparatus 44".

Figure 10:
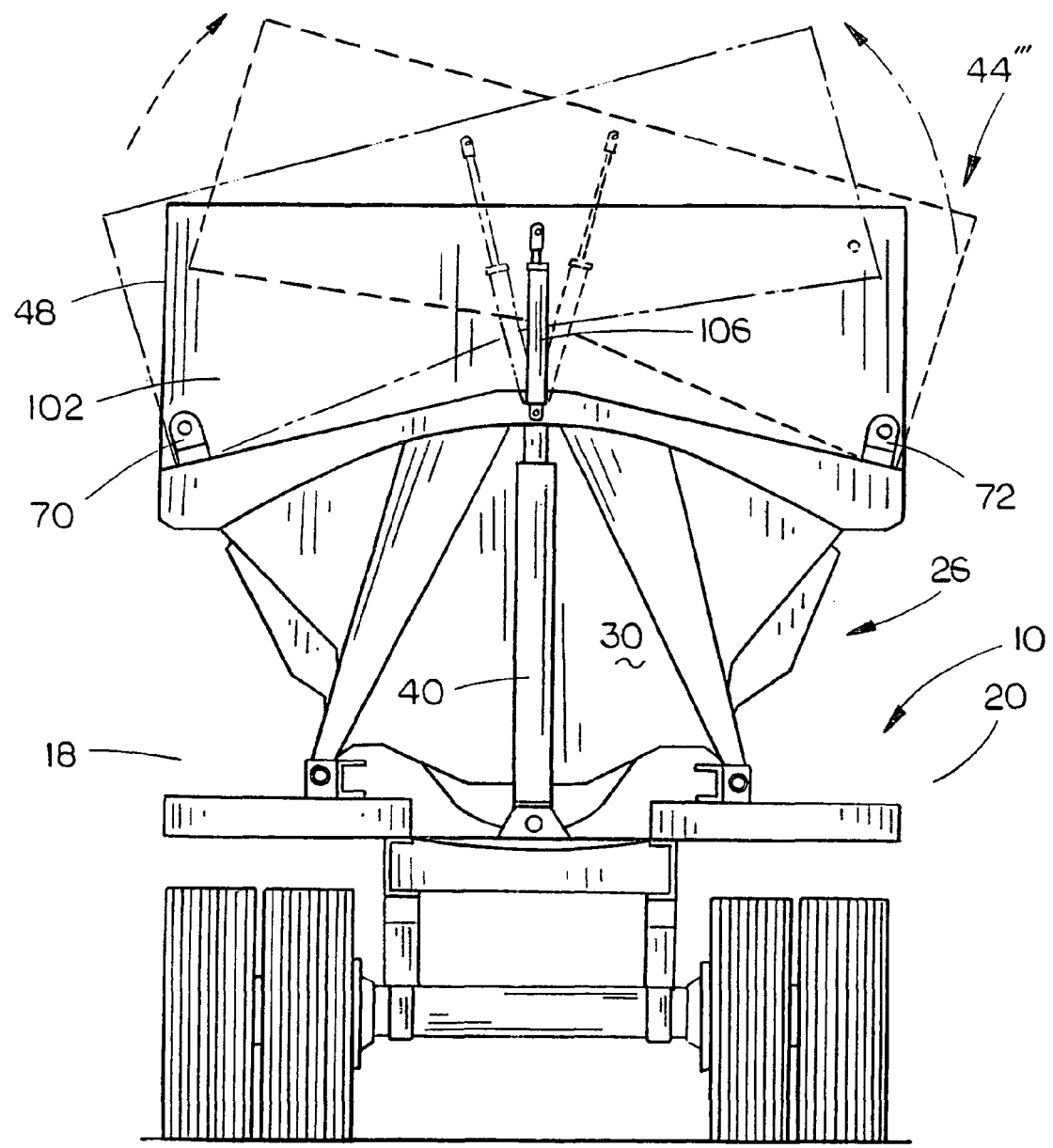
FIG. 10 is a rear view of the fourth embodiment of the wall extension apparatus with the broken lines illustrating the wall extension apparatus in its first and second side dumping positions.
Figure 11:
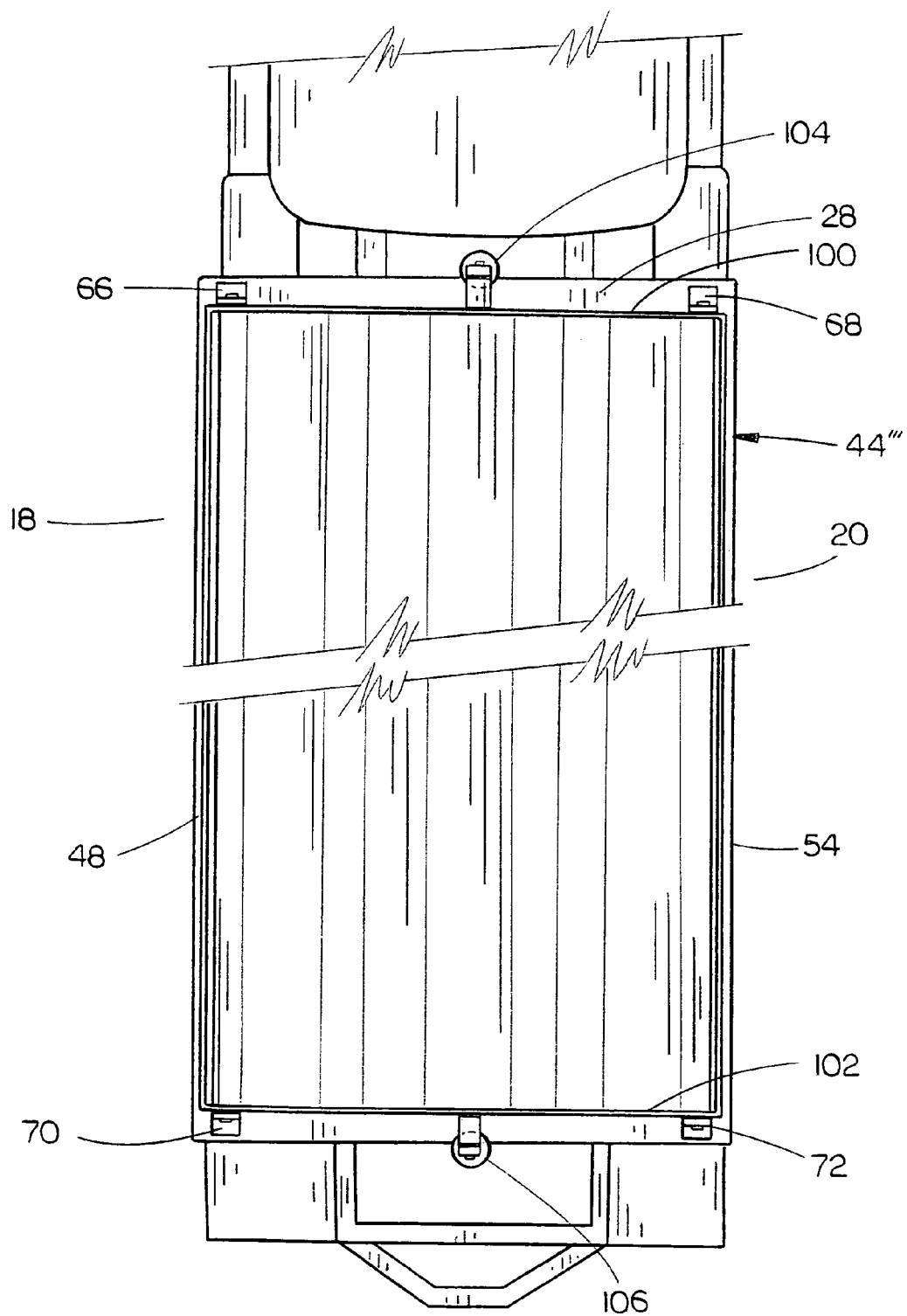
FIG. 11 is a partial top view of the fourth embodiment of FIG. 10.

The wall extension apparatus illustrated FIG. 10 and 11 is referred to generally by the reference numeral 44'''. The primary differences between apparatus 44''' and apparatus 44 is that a single forward wall member 100 replaces forward end wall members 46 and 52 and that a single rearward wall member 102 replaces rearward wall member 50 and 56. A first side wall member 48 is secured to and extends between the left ends of forward wall member 100 and rearward wall member 102. A second side wall member 54 is secured to and extends between the right ends of forward wall member 100 and rearward wall member 102. The wall members 100,102, 48 and 54 form a generally rectangular box-like wall extension apparatus. Locking pins 66, 68, 70 and 72 are also used with this embodiment. A hydraulic cylinder 104 is pivotally secured to and extends between the framework of forward end wall 28 of side dump body 26 and forward wall member 100. A hydraulic cylinder 106 is pivotally secured to and extends between the framework of end wall 30 of side dump body 26 and rearward wall member 102. When locking pins 66 and 70 are unlocked, the extension of cylinders 104 and 106 will cause wall extension apparatus 44''' to move from its transport position illustrated by solid lines in FIG. 10 to the broken line position of FIG. 10. When locking pins 68 and 72 are unlocked, the extension of cylinders 104 and 106 causes the wall extension apparatus to move to its second side dumping apparatus also illustrated by broken lines in FIG. 10.

Figure 12:
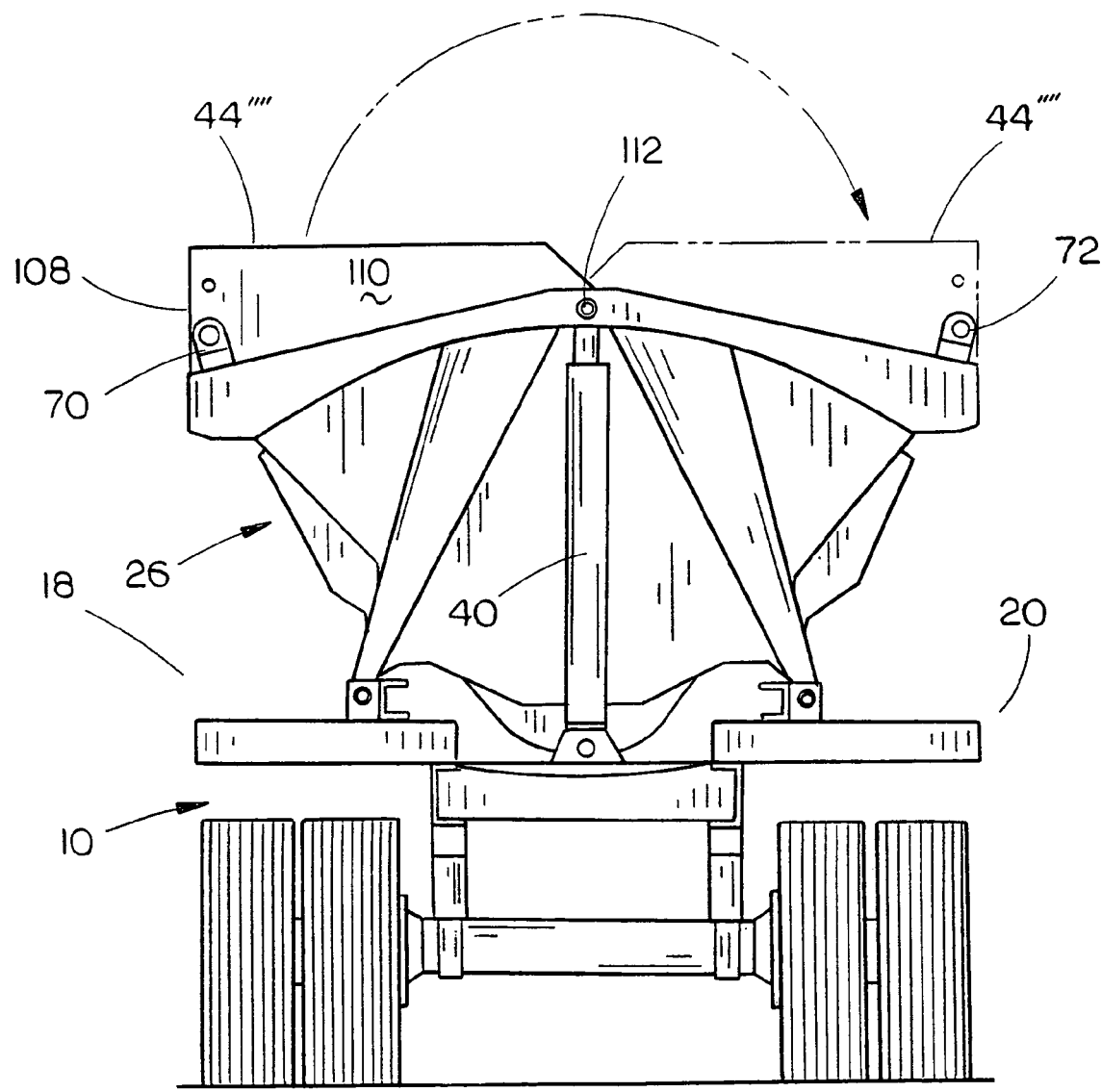
FIG. 12 is a rear view of a fifth embodiment of the wall extension apparatus.

A further embodiment of the wall extension apparatus is illustrated in FIG. 12 and is referred to by the reference numeral 44''''. Apparatus 44'''' is manually movable between its transport position shown by solid and broken lines in FIG. 12. Apparatus 44'''' utilizes a single side wall member 108 which extends between identical wall members 110 positioned at the forward and rearward ends thereof which extend inwardly therefrom and which are pivotally secured to the end walls of the side dump body 26 at 112.

Figure 13:
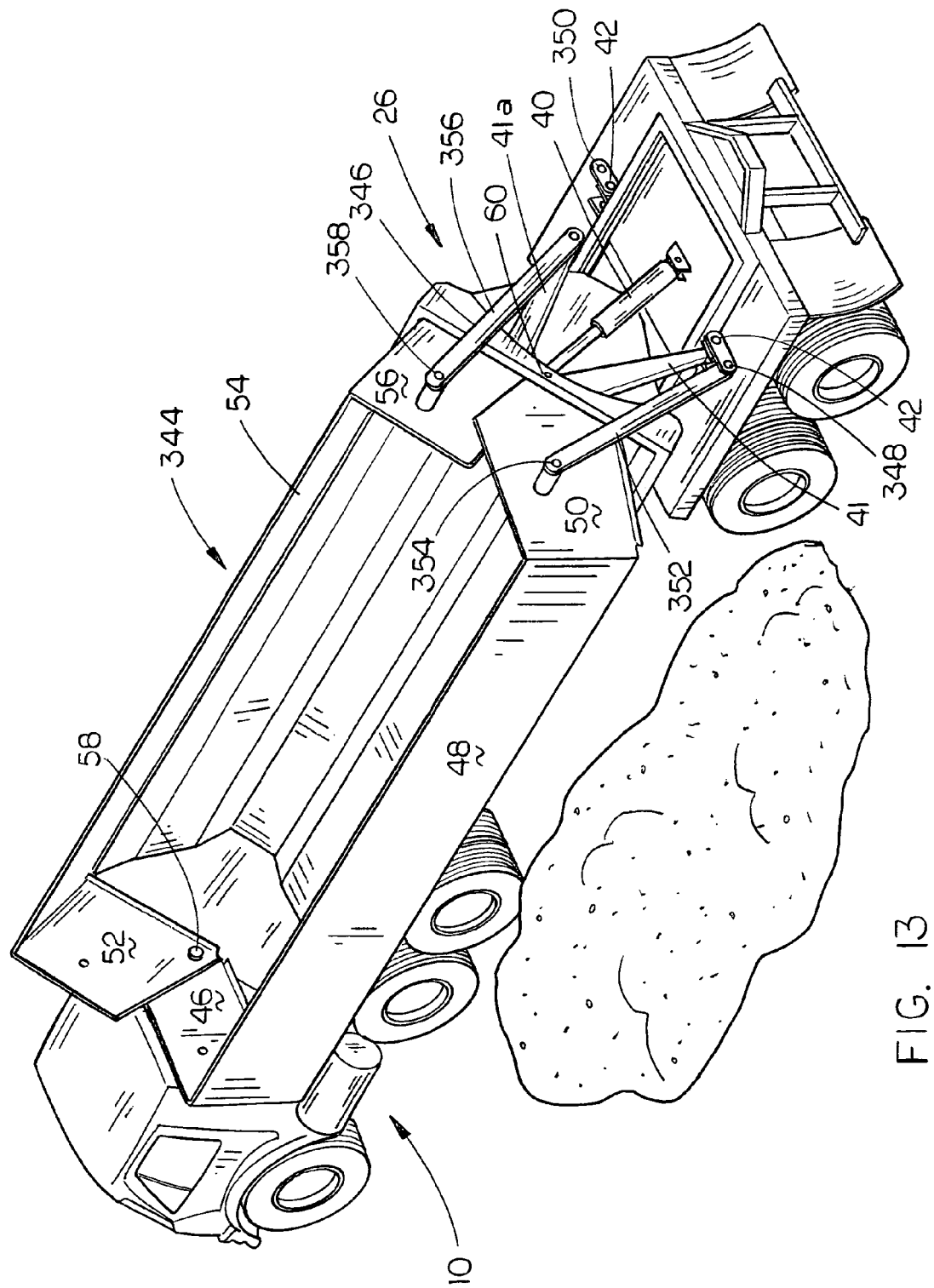
FIG. 13 is a rear perspective view of a sixth embodiment of this invention with the side dump trailer being shown in its first side dumping position.
Figure 14:
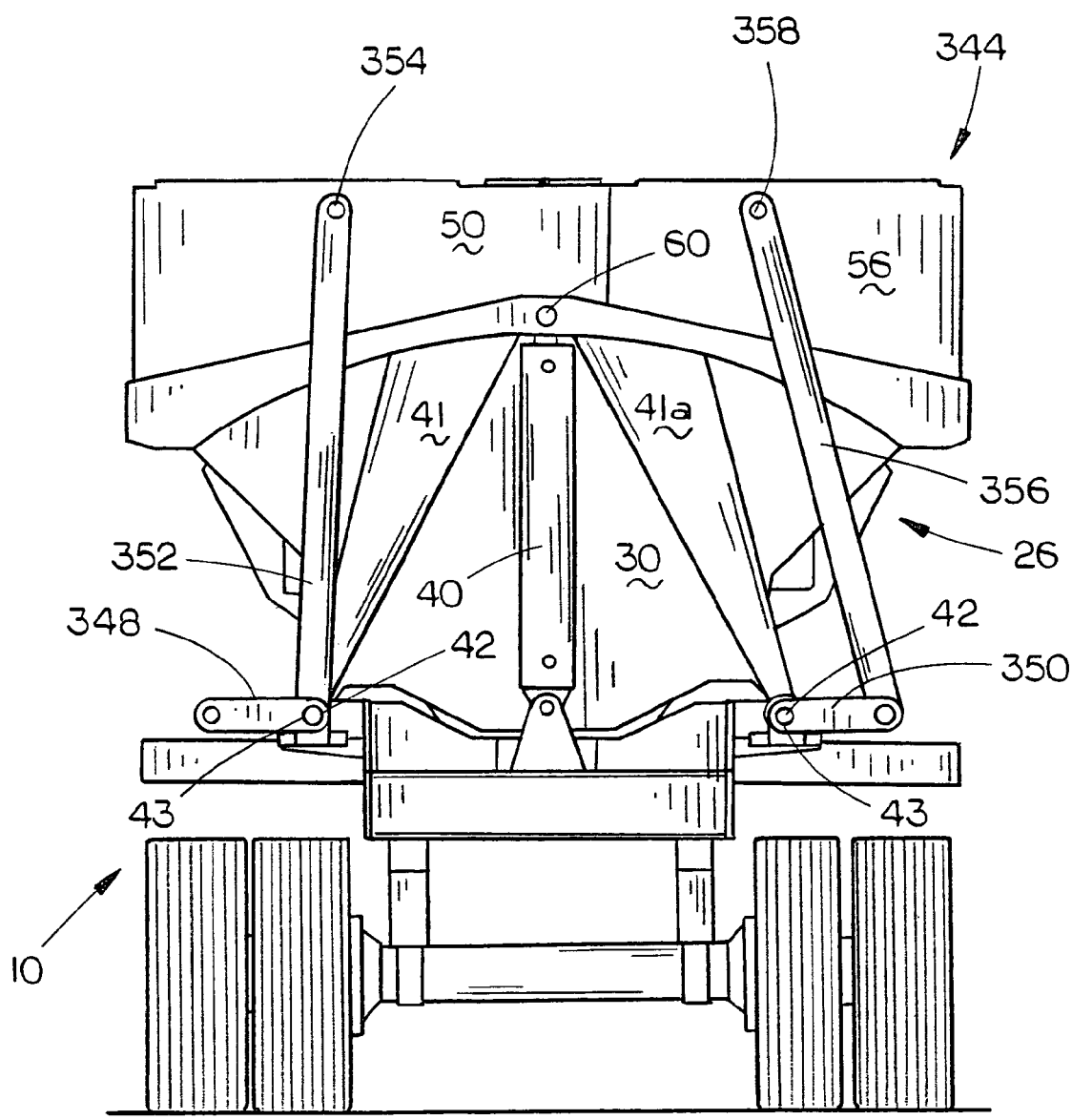
FIG. 14 is a rear view of the embodiment of FIG. 13 with the wall extension apparatus being illustrated in a transport position.

The wall extension apparatus of FIGS. 13-15 is essentially the same as that previously described. The identical structure in FIGS. 13-15 to that previously disclosed will be designated with identical numbers. In FIGS. 13-15, a structure 346 is illustrated as being positioned at the rearward end of the side dump body 26 and the wall extension apparatus. An identical structure to that shown in FIGS. 13-15 is also provided at the forward end of the side dump body.

In FIGS. 13-15, the numeral 42 refers to hinge members secured to the wheeled frame 10 at the four corners of the wheeled frame which are adapted to selectively receive the hinge members or pivot pins 43 secured to the lower ends of the frames 41 and 41a provided at the rearward and forward ends of the side dump body 26 in generally conventional fashion. As seen in FIG. 14, supports 348 and 350 are secured to each of the hinge members 42 and extend outwardly therefrom. An elongated link member 352 has its upper end pivotally secured to rearward wall member 50 at 354 and has its lower end pivotally secured to either the outer end of support 348 or to hinge member 43 at the lower end of frame 41.

An elongated link member 356 has its upper end pivotally secured to rearward wall member 56 at 358. The lower end of link member 356 is selectively secured to either the outer end of support 350 or to the hinge member 43 at the lower end of frame 41a. Again, the structure just disclosed is also found at the forward end of the side dump body.

FIG. 14 illustrates the side dump body 26 and the wall extension apparatus in their transport positions. In the transport position, the lower ends of the link members 352 and 356 may either be secured to the outer ends of supports 348 and 350 or to the hinge members at the lower ends of frames 41 and 41a. If the side dump body 26 is to be pivotally moved from its transport position of FIG. 14 to its second side dumping position of FIG. 15, the lower end of link member 352 is secured to the hinge member at the lower end of frame 41 so as to be able to move therewith. At that time, the lower end of link member 356 is connected to the outer end of support 350, if not previously done so. The same procedure is duplicated at the forward end of the side dump body 26.

The extension of the hydraulic cylinders 40 at the forward and rearward ends of the side dump body causes the side dump body to be pivotally moved with respect to the wheeled frame 10 and causes the wall members 52, 54 and 56 to be moved to their "open" or side dumping position illustrated in FIG. 15. As the side dump body 26 moves to its dumping position of FIG. 15, the lower end of link member 352 moves with the side dump body to maintain wall members 46, 48 and 50 in their closed or transport position. Subsequent retraction of the hydraulic cylinders 40 causes the side dump body 26 and the wall extension apparatus to be returned to their transport positions.

If it is desired to pivotally move the side dump body 26 to the first side dumping position of FIG. 13, the lower end of link member 352 is connected to the outer end of support 348 and the lower end of link member 356 is connected to the hinge member 43 at the lower end of the frame 41a. The same procedure is accomplished at the forward end of the side dump body. Extension of the hydraulic cylinders 40 at the forward and rearward ends of the side dump body 26 causes the side dump body 26 and wall extension apparatus 344 to be pivotally moved to their first side dumping positions illustrated in FIG. 13. As the side dump body 26 moves to its dumping position of FIG. 13, the lower end of link member 356 moves with the side dump body to maintain wall members 52, 54 and 56 in their closed or transport position.

Thus it can be seen that the embodiment of FIGS. 13-15 accomplishes at least all of its stated objectives.

The invention claimed is:

1. In combination:

a wheeled frame having a forward end, a rearward end, a first side and a second side;

said wheeled frame including spaced-apart first and second hinge members secured thereto forwardly of its said rearward end and third and fourth spaced-apart hinge members secured thereto adjacent its second rearward end;

a side dump body movably mounted on said wheeled frame and having a rearward end, a forward end, a first side, a second side and an open upper end;

said side dump body including a bottom wall, first and second side walls extending upwardly from said bottom wall, a forward end wall, and a rearward end wall;

each of said first and second side walls of said side dump body having forward and rearward ends and an upper end;

each of said forward and rearward end walls of said side dump body having first and second ends and an upper end;

said side dump body being pivotally movable with respect to said wheeled frame so as to be able to dump contents thereof from a transport position towards said first side or said second side of said wheeled frame;

a wall extension apparatus movably positioned on said upper ends of said walls of said side dump body;

said wall extension apparatus including: (a) an upstanding first side wall member having an upper end, a lower end, a forward end and a rearward end, (b) an upstanding second side wall member having an upper end, a lower end, a forward end and a rearward end, (c) a first upstanding forward wall member having an upper end, a lower end, an outer end and an inner end, (d) a second upstanding forward wall member having an upper end, a lower end, an outer end and an inner end, (e) a first upstanding rearward wall member having an upper end, a lower end, an outer end and an inner end, and (f) a second upstanding rearward wall member having an upper end, a lower end, an outer end and inner end;

said first and second forward wall members of said wall extension apparatus extending inwardly towards one another from said forward ends of said first and second side walls of said side dump body respectively with the inner ends thereof overlapping one another;

said first and second rearward wall members of said wall extension apparatus extending inwardly towards one another from said rearward ends of said first and second side walls of said side dump body respectively with the inner ends thereof overlapping one another;

said lower inner ends of said first forward wall member and said second forward wall members of said wall extension apparatus being hingedly secured to said forward end wall of said side dump body about a horizontal axis;

said lower inner ends of said first rearward wall member and said second rearward wall member of said wall extension apparatus being hingedly secured to said rearward end wall of said side dump body about a horizontal axis;

said first forward wall member, said first side wall member and said first rearward wall member of said wall extension apparatus being selectively movable with respect to said side dump body between a transport position and a first side dumping position;

said lower ends of said first forward wall member, said first side wall member and said first rearward wall member of said wall extension apparatus being in engagement with said upper ends of said forward end wall, said first side wall portion and said rearward end wall of said side dump body when said wall members are in their transport position;

said lower end of said first side wall member of said wall extension apparatus being spaced from said upper end of said first side wall of said side dump body when said wall members are in their first side dumping position;

said second forward wall member, said second side wall member and said second rearward wall member of said wall extension apparatus being selectively movable with respect to said side dump body between a transport position and a second side dumping position;

said lower ends of said second forward wall member, said second side wall member and said second rearward wall member of said wall extension apparatus being in engagement with said upper ends of said forward end wall, said second side wall and said rearward wall of said side dump body when said wall members are in their transport position;

said lower end of second side wall member of said wall extension apparatus being spaced from said upper end of said second side wall of said side dump body when said wall members are in their second side dumping position;

said wall extension apparatus including structure which causes said first forward wall member, said first side wall member and said first rearward wall member to move from their transport position to a dumping position as said side dump body moves from its transport position to its first side dumping position;

said wall extension apparatus also including structure which causes said second forward wall member, said second side wall member and said second rearward wall member to move from their transport position to a dumping position as said side dump body moves from its transport position to its second side dumping position.

2. In combination:

a wheeled frame having a forward end, a rearward end, a first side and a second side;

said wheeled frame including spaced-apart first and second hinge members secured thereto forwardly of its said rearward end and third and fourth spaced-apart hinge members secured thereto adjacent its said rearward end;

a side dump body movably mounted on said wheeled frame and having a rearward end, a forward end, a first side, a second side and an open upper end;

said side dump body including a bottom wall, first and second side walls extending upwardly from said bottom wall, a forward end wall, and a rearward end wall;

each of said first and second side walls of said side dump body having forward and rearward ends and an upper end;

each of said forward and rearward end walls of said side dump body having first and second ends and an upper end;

said side dump body having first, second, third and fourth hinge members secured thereto which are adapted to be selectively rotatably received by said first, second, third and fourth hinge members which are secured to said wheeled frame;

said side dump body being pivotally movable with respect to said wheeled frame so as to be able to dump contents thereof towards said first side or said second side of said wheeled frame;

a wall extension apparatus movably positioned on said upper ends of said walls of said side dump body;

said wall extension apparatus including: (a) an upstanding first side wall member having an upper end, a lower end, a forward end and a rearward end, (b) an upstanding second side wall member having an upper end, a lower end, a forward end and a rearward end, (c) a first upstanding forward wall member having an upper end, a lower end, an outer end and an inner end, (d) a second upstanding forward wall member having an upper end, a lower end, an outer end and an inner end, (e) a first upstanding rearward wall member having an upper end, a lower end, an outer end and an inner end, and (f) a second upstanding rearward wall member having an upper end, a lower end, an outer end and inner end;

said first and second forward wall members of said wall extension apparatus extending inwardly towards one another from said forward ends of said first and second side walls of said side dump body respectively with the inner ends thereof overlapping one another;

said first and second rearward wall members of said wall extension apparatus extending inwardly towards one another from said rearward ends of said first and second side walls of said side dump body respectively with the inner ends thereof overlapping one another;

said lower inner ends of said first forward wall member and said second forward wall member of said wall extension apparatus being hingedly secured to said forward end wall of said side dump body about a horizontal axis;

said lower inner ends of said first- rearward wall member and said second rearward wall member of said wall extension apparatus being hingedly secured to said rearward end wall of said side dump body about a horizontal axis;

said first forward wall member, said first side wall member and said first rearward wall member of said wall extension apparatus being selectively movable with respect to said side dump body between a transport position and a first side dumping position;

said lower ends of said first forward wall member, said first side wall member and said first rearward wall member of said wall extension apparatus being in engagement with said upper ends of said forward end wall, said first side wall and said rearward end wall of said side dump body when said wall members are in their transport position;

said lower end of said first side wall member of said wall extension apparatus being spaced from said upper end of said first side wall of said side dump body when said wall members are in their first side dumping position;

said second forward wall member, said second side wall member and said second rearward wall member of said wall extension apparatus being selectively movable with respect to said side dump body between a transport position and a second side dumping position;

said lower ends of said second forward wall member, said second side wall member and said second rearward wall member of said wall extension apparatus being in engagement with said upper ends of said forward end wall, said second side wall and said rearward wall of said side dump body when said wall members are in their transport position;

said lower end of second side wall member of said wall extension apparatus being spaced from said upper end of said second side wall of said side dump body when said wall members are in their second side dumping position;

said lower outer ends of said first forward wall member, said second forward wall member, said first rearward wall member and said second rearward wall member being selectively removably secured to said forward wall and said rearward wall of said side dump body respectively;

a forward hydraulic cylinder pivotally secured to and extending between said wheeled frame and said forward end of said side dump body;

a rearward hydraulic cylinder pivotally secured to and extending between said wheeled frame and said rearward end of said side dump body;

a first support, having inner and outer ends, having its said inner end secured to said first hinge member of said wheeled frame at said forward end thereof at said first side thereof;

a second support, having inner and outer ends, having its said inner end secured to said second hinge member of said wheeled frame at said forward end thereof at said second side thereof;

a third support, having inner and outer ends, having its inner end secured to said third hinge member of said wheeled frame at said rearward end thereof at said first side thereof;

a fourth support, having inner and outer ends, having its inner end secured to said fourth hinge member of said wheeled frame at said rearward end thereof at said second side thereof;

a first elongated link member having upper and lower ends;

a second elongated link member having upper and lower ends;

a third elongated link member having upper and lower ends;

a fourth elongated link member having upper and lower ends;

said upper end of said first link member being operatively pivotally secured to said first forward wall member of said wall extension apparatus;

said upper end of said second link member being operatively pivotally secured to said second forward wall member of said wall extension apparatus;

said upper end of said third link member being operatively pivotally secured to said first rearward wall member of said wall extension apparatus;

said upper end of said fourth link member being operatively pivotally secured to said second rearward wall member of said wall extension apparatus;

said lower end of said first link member being selectively secured to either said outer end of said first support or to said first hinge member of said side dump body;

said lower end of said second link member being selectively secured to either said outer end of said second support or to said second hinge member of said side dump body;

said lower end of said third link member being selectively secured to either said outer end of said third support or to said third hinge member of said side dump body;

said lower end of said fourth link member being selectively secured to said outer end of said fourth support or to said fourth hinge member of said side dump body;

when it is desired to dump the contents of said side dump body towards said first side of said wheeled frame: (a) the lower ends of said second and fourth link members are connected to said second and fourth hinge members of said side dump body; (b) the lower ends of said first and third link members are connected to said outer ends of said first and third supports, (c) the second and fourth hinge members of said side dump body are released from said second and fourth hinge members of said wheeled frame, and (d) the forward and rearward hydraulic cylinders are extended;

when it is desired to dump the contents of said side dump body towards said second side of said wheeled frame: (a) the lower ends of said first and second link members are connected to said first and third hinge members of said side dump body, (b) the lower ends of said second and fourth link members are connected to said outer ends of said second and fourth supports, (c) the first and third hinge members of said side dump body are released from said first and third hinge members of said wheeled frame, and (d) the forward and rearward hydraulic cylinders are extended.

3. In combination:

a wheeled frame having a forward end, a rearward end, a first side and a second side;

a side dump body movably mounted on said wheeled frame and having a rearward end, a forward end, a first side, a second side and an open upper end;

said side dump body including a bottom wall, first and second side walls extending upwardly from said bottom wall, a forward end wall, and a rearward end wall;

each of said first and second side walls of said side dump body having forward and rearward ends and an upper end;

each of said forward and rearward end walls of said side dump body having first and second ends and an upper end;

said side dump body being pivotally movable with respect to said wheeled frame so as to be able to dump contents thereof from a transport position towards said first side or said second side of said wheeled frame;

a wall extension apparatus movably positioned on said upper ends of said walls of said side dump body;

said wall extension apparatus including a first wall extension assembly and a second wall extension assembly;

said wall extension assemblies including lower ends which normally are in engagement with the upper ends of said walls of said side dump body when in a transport position;

each of said first wall extension assembly being selectively movable from the transport position to a dumping position wherein said lower end of said first wall extension assembly is spaced from the upper end of said side dump body at one side thereof when in its dumping position and wherein said lower end of said second wall extension assembly is spaced from the upper end of said side dump body when in its dumping position.

* * * * *